(12) United States Patent
Chen

(10) Patent No.: US 9,004,679 B2
(45) Date of Patent: Apr. 14, 2015

(54) LENS DEVICE

(71) Applicant: Hwa Meei Optical Co., Ltd., Tainan (TW)

(72) Inventor: Chih Ming Chen, Tainan (TW)

(73) Assignee: Hwa Meei Optical Co., Ltd., Tainan (TW)

( * ) Notice: Subject to any disclaimer, the term of this patent is extended or adjusted under 35 U.S.C. 154(b) by 44 days.

(21) Appl. No.: 13/928,552

(22) Filed: Jun. 27, 2013

(65) Prior Publication Data

US 2015/0002805 A1   Jan. 1, 2015

(51) Int. Cl.
*G02C 1/04* (2006.01)
*G02C 5/20* (2006.01)

(52) U.S. Cl.
CPC ........................................ *G02C 5/20* (2013.01)

(58) Field of Classification Search
CPC .................................................... G02C 5/2209

USPC ........................ 351/92, 90, 106, 103, 86, 83
See application file for complete search history.

(56) References Cited

U.S. PATENT DOCUMENTS

| | | | |
|---|---|---|---|
| 6,863,395 B1 * | 3/2005 | Teng .............................. | 351/103 |
| 6,926,404 B2 * | 8/2005 | Bassahon et al. ............. | 351/103 |
| 8,668,330 B2 * | 3/2014 | Reyes et al. ................... | 351/106 |
| 2008/0137028 A1 * | 6/2008 | Webb ............................ | 351/106 |
| 2011/0279771 A1 * | 11/2011 | Chen ............................. | 351/140 |

\* cited by examiner

*Primary Examiner* — Hung Dang
(74) *Attorney, Agent, or Firm* — Rosenberg, Klein & Lee

(57) ABSTRACT

A lens device includes a frame, at least one lens and two fasteners. The frame has at least a lens recess. The lens is embedded in the lens recess, and has an indentation located at an edge of the lens. The fasteners are disposed pivotally to the opposite sides of the frame, respectively, and each have an inner surface, a supporting surface and a hook portion. The inner surface adjoins the supporting surface. The hook portion protrudes from the inner surface. When the fastener rotates so that the hook portion enters into the indentation of the lens, the supporting surface of the fastener is disposed against a side of the indentation.

9 Claims, 5 Drawing Sheets

LENS DEVICE

BACKGROUND OF THE INVENTION

1. Field of the Invention

The invention relates to a lens device.

2. Description of the Prior Art

In general, a pair of eyeglasses mainly includes a frame and two temples respectively pivoted on two sides of the frame. The frame includes two rims, and the inner edge of each of the rims has a slot to hold the corresponding lens. Accordingly, the sidewalls of the slot can block the lenses to prevent them from leaving the frame. In this case, however, the lens needs to be hard pressed into the slot to be fixed to the frame although the frame is a little flexible. In addition, the user's improper assembling might cause the lens or frame to be broken or easily scratched.

SUMMARY OF THE INVENTION

In view of the foregoing subject, an objective is to provide a lens device whose lens is easily fixed, and thereby the usability and lifespan of the product can be increased.

To achieve the above objective, a lens device according to this invention includes a frame, at least one lens, and two fasteners. The frame has at least a lens recess. The lens is embedded in the lens recess, and has an indentation located at an edge of the lens. The fasteners are disposed pivotally to the opposite sides of the frame, respectively, and each have an inner surface, a supporting surface and a hook portion. The inner surface adjoins the supporting surface. The hook portion protrudes from the inner surface. When the fastener rotates so that the hook portion enters into the indentation of the lens, the supporting surface of the fastener is disposed against a side of the indentation.

In one embodiment, the frame has two symmetrically disposed lens recesses, and the lens device has two lenses which are respectively embedded in the lens recesses.

In one embodiment, the inner surface and the supporting surface form an included angle between 60° and 120°.

In one embodiment, the frame further has an against surface adjacent to the lens recess, the against surface and the first side of the lens recess are configured with a height difference, and when the hook portion is disposed in the indentation of the lens, the inner surface of the fastener is against the against surface.

In one embodiment, the frame further includes a locking portion. The looking portion connects to the against surface and the first side, and locks the hook portion.

In one embodiment, the lens device further comprises two temples, which are disposed pivotally to the opposite sides of the frame, respectively.

In one embodiment, the fastener and the temple are disposed pivotally to the frame by the same axle.

In one embodiment, the hook portion is disposed against a second side of the lens recess.

In one embodiment, a first side and second side of the lens recess form a visible zone, and the side of the indentation of the lens and an edge of the visible zone are evened.

In one embodiment, the fasteners are disposed on an inner side of the frame.

In one embodiment, the lens device is sunglasses, working goggles, nearsighted eyeglasses, farsighted spectacles, presbyopia eyeglasses or snow goggles.

As mentioned above, the fastener of the lens device according to this invention is disposed pivotally to the frame and is rotatable in relation to the frame. When the fastener rotates so that the hook portion enters into the indentation of the lens, the supporting surface of the fastener can press against a side of the indentation for fixing the lens. Thereby, either the assembly or disassembly, the lens doesn't need to be pushed hard into the slot of the frame (as the prior art) so that the lens can be prevented from being damaged. Furthermore, the lens of the lens device of the invention is very easy to be fixed, and thereby the usability and lifespan of the product can be increased and enhanced. Besides, with the convenient assembly and disassembly of the invention, the user can easily replace the lens.

DETAILED DESCRIPTION OF THE INVENTION

Figure 1:
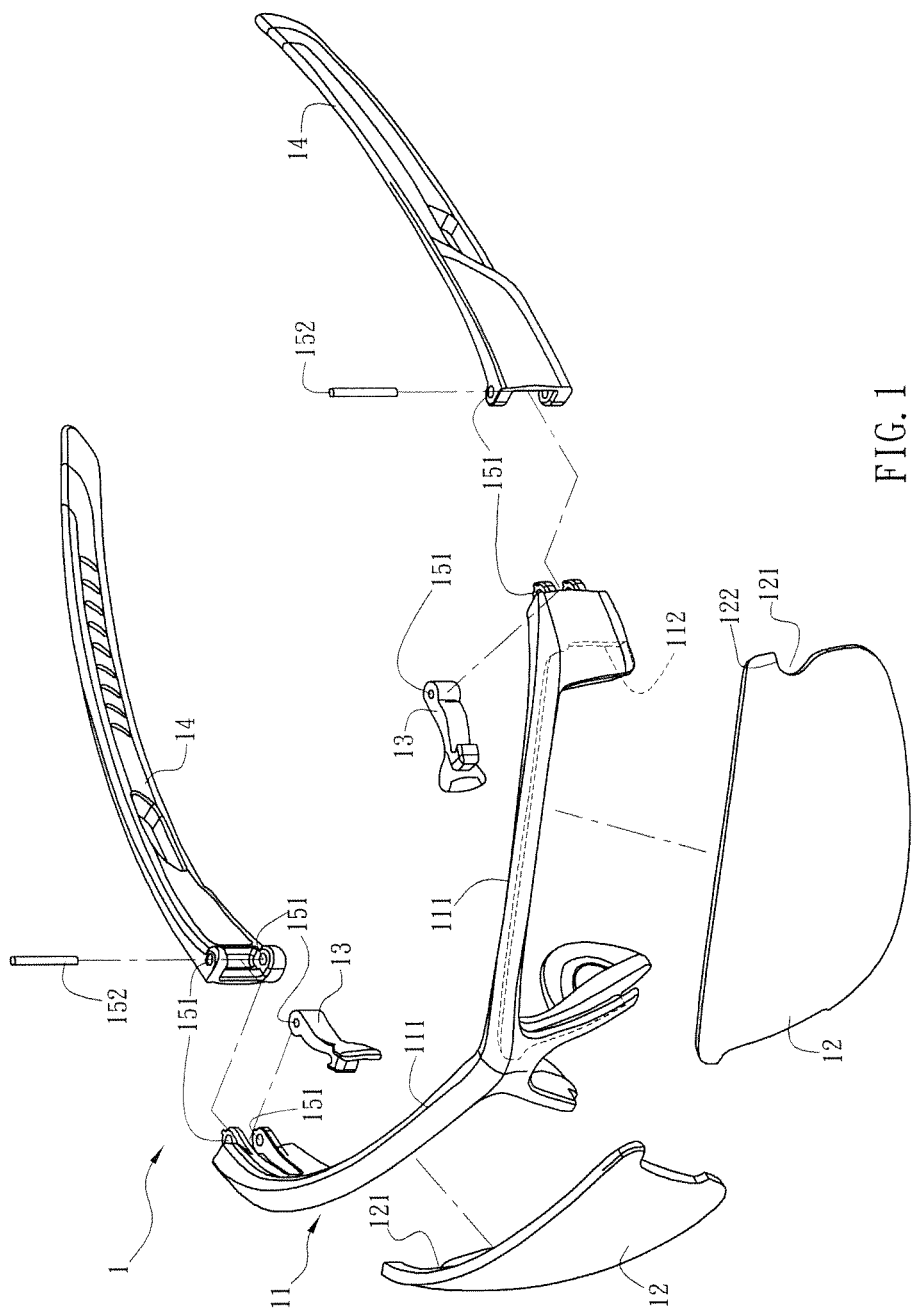
FIG. 1 is a schematic exploded diagram of a lens device of a preferred embodiment of the invention.
Figure 2:
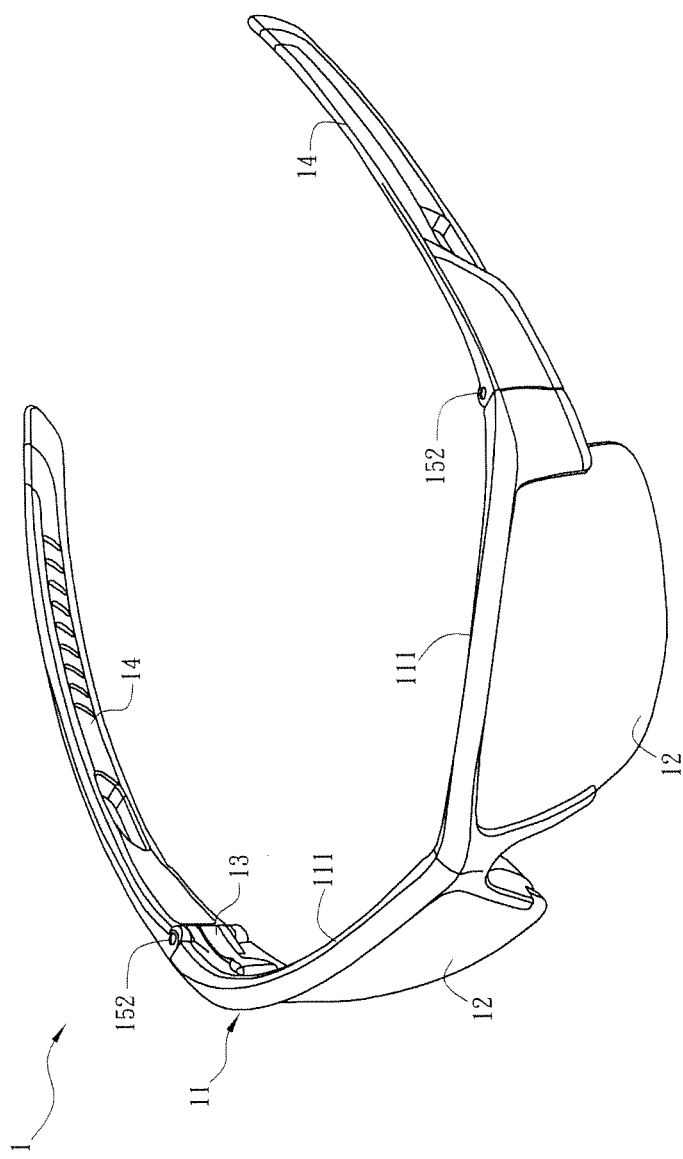
FIG. 2 is a schematic diagram of the lens device in FIG. 1.

FIG. 1 is a schematic exploded diagram of a lens device 1 of a preferred embodiment of the invention, and FIG. 2 is a schematic diagram of the lens device 1 in FIG. 1. As shown in FIGS. 1 and 2, the lens device 1 includes a frame 11, at least a lens 12 and two fasteners 13. In the invention, the lens device 1 is not limited in type, which can be sunglasses, working goggles, nearsighted eyeglasses, farsighted spectacles, presbyopia eyeglasses, snow goggles, or the like.

The frame 11 functions as the main part of the lens device 1. The frame 11 of this embodiment is not limited in shape or curvature, which can be changed according to the practical requirements. The frame 11 is also not limited in material, which can be made by, for example, metal, alloy or plastic material. In this embodiment, the frame 11 has two lens-holding portions 111 for holding two lenses 12. Besides, the lens-holding portion 111 just has an upper portion but without a lower portion. That means the lens-holding portion 111 has an unclosed form, and thereby the material can be saved. The frame 11 has at least a lens recess 112 to contain the lens. Herein, the frame 11 has two symmetrically disposed lens recesses 112, and two lenses 12 are respectively embedded in the lens recesses 112. The lens recesses 112 are respectively disposed to the lens-holding portions 111.

There are two lenses 12 in this embodiment for example, and the lens is not limited in type, which can be a nearsighted lens, a farsighted lens, a multi-focal lens, or a filter lens. The lenses 12 are respectively disposed to the lens-holding portions 111 and embedded to the lens recesses 112. The lens 12 has an indentation 121 which is located at an edge of the lens 12. The indentation 121 is not limited in form. However, since the indentation 121 is pressed by the fastener 13, the form of the indentation 121 can be designed according to the fastener 13.

The fasteners 13 are pivotally disposed to the opposite sides of the frame 11, respectively. Herein, the lens device 1 can further include two temples 14, which are also disposed pivotally to the opposite sides of the frame 11, respectively. Besides, the fastener 13 and the temple 14 are disposed pivotally to the frame 11 by the same axle. The pivoting structure of the fastener 13, temple 14 and frame 11 is not limited in type. For example, the pivoting structure includes a plurality of through holes 151 and a plurality of pins 152, and by the pins 152 passing through the through holes 151, the fastener 13 and the temple 14 can be disposed pivotally to the frame 11 by the same axle. In other embodiments, the pivoting structure can be a component independent of the frame 11, and when the pivoting structure is connected to the frame 11, the fastener 13 and the temple 14 are disposed pivotally to the frame 11 by the same axle. In other embodiments, the fastener 13 and the temple 14 also can be disposed pivotally to the frame by different axles. In this embodiment, the fastener 13 is disposed on an inner side of the frame 11 and fixes the lens 12 to the frame 11.

Figure 3:
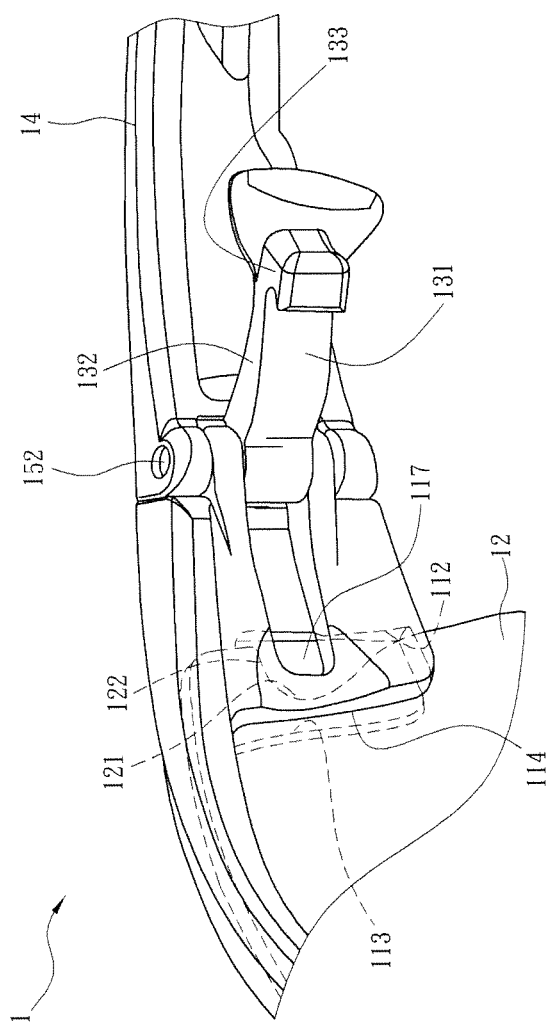
FIG. 3 is a schematic perspective diagram of a part of the lens device according to a preferred embodiment of the invention.
Figure 4:
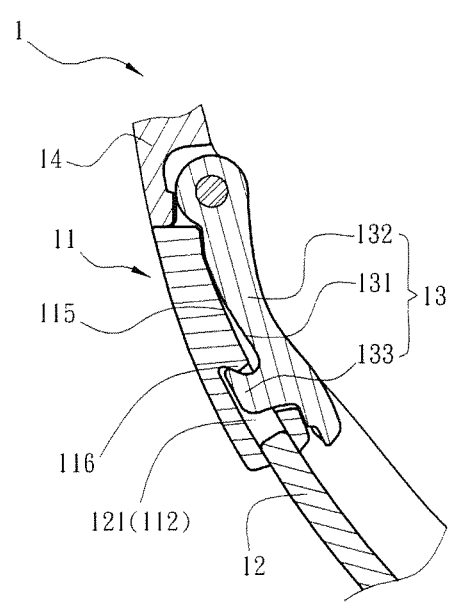
FIGS. 4 and 5 are schematic cross-sectional diagrams of the fastener fixing the lens and separating from the lens according to this embodiment.
Figure 5:
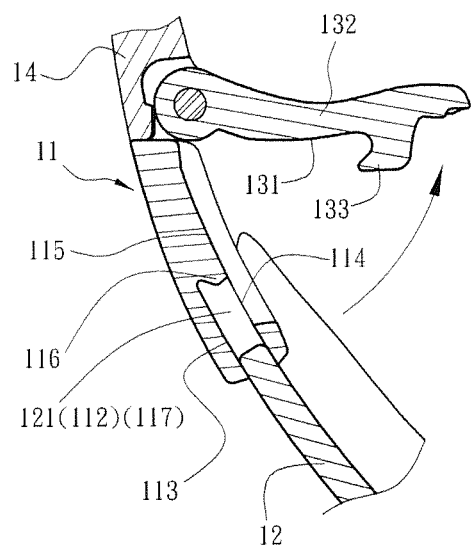

FIGS. 3 to 5 are schematic diagrams showing how the fastener 13 fixes the lens 12 to the frame 11. FIG. 3 is a perspective diagram of a part of the lens device 1 according to a preferred embodiment of the invention, and FIGS. 4 and 5 are cross-sectional diagrams of the fastener 13 fixing the lens 12 and separating from the lens 12. As shown in FIGS. 3 to 5, the fastener 13 has an inner surface 131, a supporting surface 132 and a hook portion 133. The inner surface 131 adjoins the supporting surface 132. The inner surface 131 and the supporting surface 132 form an included angle that is between 60° and 120°, and herein the included angle is 90° for example. The hook portion 133 protrudes from the inner surface 131. Herein, the hook portion 133 and the inner surface 131 are formed integrally for example.

When the fastener 13 rotates so that the hook portion 133 enters into the indentation 121 of the lens 12, the supporting surface 132 of the fastener 13 presses against a top side 122 of the indentation 121. Thereby, the lens 12 is fixed to the lens recess 112 of the frame 11, as shown in FIG. 4.

Furthermore, the lens recess 112 is formed by a first side 113 and a second side 114 with an interval therebetween (as shown in FIG. 5). The frame 11 further has an against surface 115, which is adjacent to the lens recess 112. The against surface 115 of the frame 11 and the first side 113 of the lens recess 112 are configured with a height difference. When the hook portion 13 is disposed in the indentation 121 of the lens 12, the inner surface 131 of the fastener 13 is against the against surface 115. The frame 11 further includes a locking portion 116, which connects the against surface 115 and the first side 113 and locks the hook portion 133. Herein, the locking portion 116 and the hook portion 133 are shaped as hooking each other, and thereby the fastener 13 can more firmly fix the lens 12 to the frame 11.

As shown in FIGS. 3 and 5, the first side 113 and second side 114 of the lens recess 112 can form a visible zone 117. In detail, the visible zone 117 is the remaining area of the lens recess 112 when blocked by the second side 114 by viewing from the inner side to outer side of the lens device 1, especially denoting the area at the indentation 121 of the lens 12. The top side 122 of the indentation 121 of the lens 12 and an edge of the visible zone 117 are evened, and thereby the fastener 13 can more tightly fix the lens 12 to the lens recess 112 of the frame 11.

In summary, the fastener of the lens device according to this invention is disposed pivotally to the frame and is rotatable in relation to the frame. When the fastener rotates so that the hook portion enters into the indentation of the lens, the supporting surface of the fastener can press against a side of the indentation for fixing the lens. Thereby, either the assembly or disassembly, the lens doesn't need to be pushed hard into the slot of the frame (as the prior art) so that the lens can be prevented from being damaged. Furthermore, the lens of the lens device of the invention is very easy to be fixed, and thereby the usability and lifespan of the product can be increased and enhanced. Besides, with the convenient assembly and disassembly of the invention, the user can easily replace the lens.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A lens device, comprising:
    a frame comprising at least a lens recess, opposite sides, and an inner and an outer side;
    at least a lens embedded in the lens recess, and having an indentation located at an edge of the lens; and
    two fasteners disposed pivotally to the opposite sides of the frame and on the inner side of the frame, respectively and each having an inner surface, a supporting surface and a hook portion, wherein the inner surface adjoins the supporting surface, the hook portion protrudes from the inner surface, and when the fastener rotates so that the hook portion enters into the indentation of the lens, the supporting surface of the fastener is disposed against a side of the indentation.

2. The lens device as recited in claim 1, wherein the frame has two symmetrically disposed lens recesses, and the lens device has two lenses which are respectively embedded in the lens recesses.

3. The lens device as recited in claim 1, wherein the inner surface and the supporting surface form an included angle that is between 60° and 120°.

4. The lens device as recited in claim 1, wherein the frame further has an against surface adjacent to the lens recess, the against surface and the first side of the lens recess are configured with a height difference, and when the hook portion is disposed in the indentation of the lens, the inner surface of the fastener is against the against surface.

5. The lens device as recited in claim 4, wherein the frame further includes a locking portion, which connects the against surface and the first side and locks the hook portion.

6. The lens device as recited in claim 1, further comprising:
    two temples disposed pivotally to the opposite sides of the frame, respectively.

7. The lens device as recited in claim 6, wherein the fastener and the temple are disposed pivotally to the frame by the same axle.

8. The lens device as recited in claim 1, wherein a first side and second side of the lens recess form a visible zone, and the side of the indentation of the lens and an edge of the visible zone are evened.

9. The lens device as recited in claim 1, which is sunglasses, working goggles, nearsighted eyeglasses, farsighted spectacles, presbyopia eyeglasses or snow goggles.

* * * * *